April 27, 1943.      F. C. HALL      2,317,763
METHOD OF MAKING HOLLOW MOLDED OBJECTS FROM ORGANIC PLASTIC MATERIAL
Filed Oct. 7, 1938
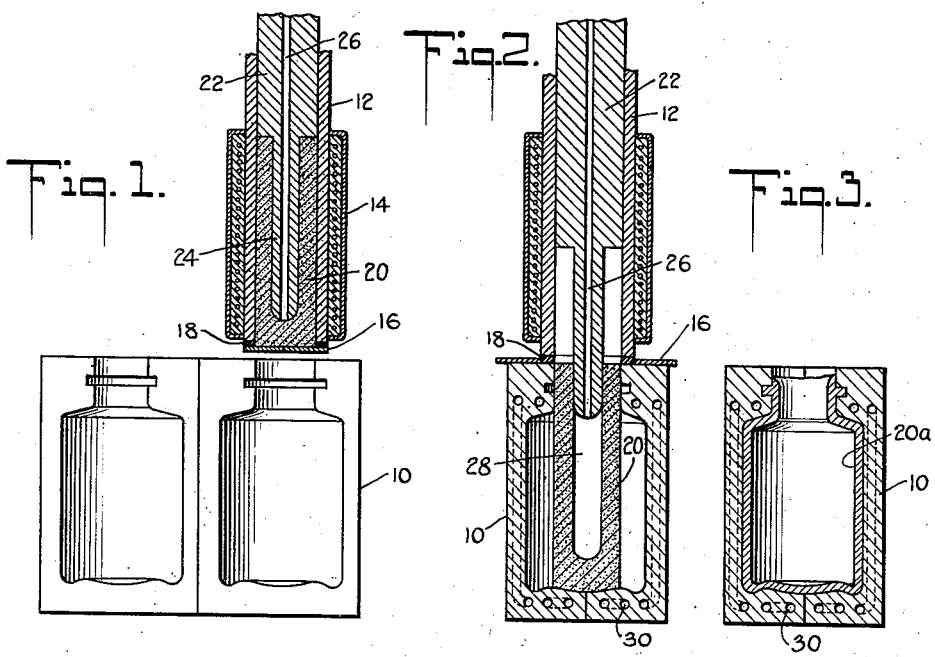
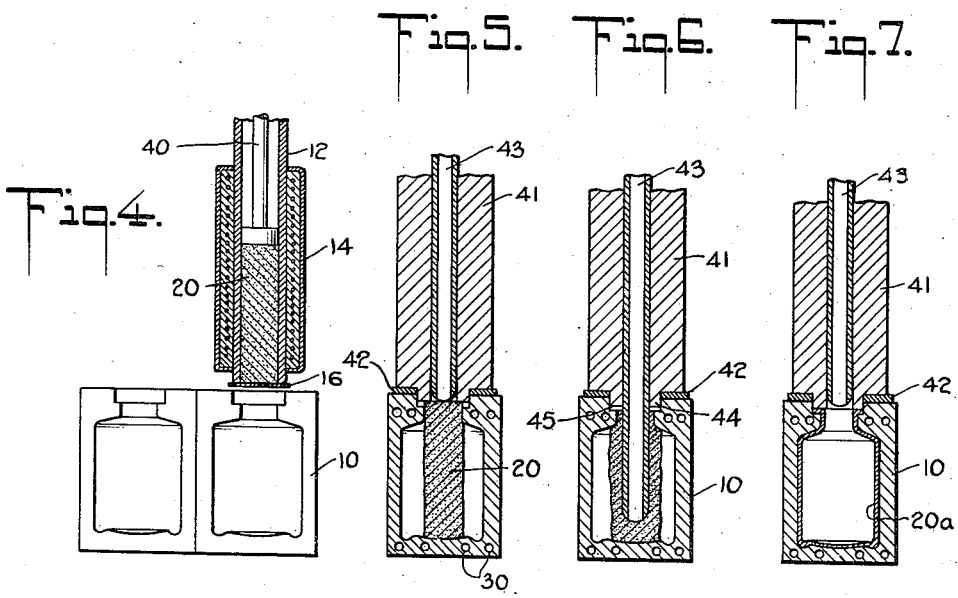
INVENTOR
Frances Cushing Hall
HER ATTORNEY Patented Apr. 27, 1943

2,317,763

UNITED STATES PATENT OFFICE 2,317,763

METHOD OF MAKING HOLLOW MOLDED OBJECTS FROM ORGANIC PLASTIC MATERIAL

Frances Cushing Hall, Mamaroneck, N. Y.

Application October 7, 1938, Serial No. 233,707

4 Claims. (Cl. 18—55)

This invention relates to the molding of hollow objects from organic plastic materials.

Particularly, the invention relates to the method of manufacture, from such materials, of relatively thin walled, hollow, objects, such as bottles or like articles, in which the diameter of the opening is less than the largest internal diameter of the object.

An object of my invention is the manufacture of entirely seamless and integral hollow objects from thermo-setting plastic, or thermo-plastic, materials, in which objects the diameter of the opening or openings is less than the greatest internal diameter of the object.

Another object of my invention is the manufacture of entirely seamless and integral hollow objects, having the opening or openings of less diameter than the greatest internal diameter of the object, from organic plastic materials requiring the application of elevated temperature and pressure for "curing" and "setting" said material into its ultimate, finished form.

The present invention is applicable to any of the common organic plastic materials, either of the thermo-plastic or thermo-setting plastic type. A typical thermo-setting plastic material which may be employed in carrying out the present invention is that which is available under the trade-name "Durez."

Pursuant to this invention, an object to be molded may be of the nature of a bottle or the like, having a relatively thin wall, and provided with a neck opening which is smaller in diameter than the diameter of the interior of the bottle.

A measured quantity of such plastic material is placed within a charging device, said device having means for heating the charge of material to a temperature which will produce a desired state of plasticity. Upon attaining such plasticity, the plastic charge is moved from the charging tube into a suitable mold. During such stage of movement, or subsequent thereto, there is formed, within the plastic charge, a central indentation of substantial depth. By introducing a gas under suitable temperature and pressure condition into such central indentation, the plastic is caused to expand outwardly until it makes contact with the walls of the mold, attaining the ultimately desired external configuration.

It is a feature of the invention that the plastic charge is heated to a degree equal to or slightly above the temperature ultimately required for molding and setting it, and that the heated plastic charge is introduced into a mold, the temperature of which is somewhat less than the temperature of the charge. Thus, the outermost portion of the cylindrical charge is cooled, and there results a surface "skin," formed by the reduced plasticity of the outer surface of the charge with respect to the inner bulk thereof. This "skin" sufficiently resists the outward expansion under gas pressure to insure an even subsequent movement of the plastic material into contact with the walls of the mold.

It is a second feature of the invention that the gas employed for expanding the plastic mass into its final configuration is under the temperature necessary to keep the plastic material at the proper temperature for molding and the pressure condition required for properly curing the plastic material, and thus, the molding and curing of the plastic are accomplished in a single step. Upon the completion of the required curing period, the gas pressure is relieved, the gas introduction means withdrawn, and the mold opened to remove the molded object therefrom.

Other features and advantages will hereinafter appear.

In the accompanying drawing, Figs. 1 to 3, inclusive, illustrate steps in carrying out one method of manufacturing hollow objects pursuant to my invention, and of such figures:

Fig. 1 represents a charge of plastic material within a charging and preheating tube;

Fig. 2 indicates the charge after its introduction into a heated mold and prior to the expansion of the charge during the molding process; and Fig. 3 is a representation of a completed molded article, prior to its removal from the mold.

Appertaining to a second embodiment of my invention,

Fig. 4 indicates a charging and preheating tube, containing a measured quantity of plastic material prior to its introduction into a heated mold;

Fig. 5 represents the heated plastic charge of material of Fig. 4 after its introduction into the mold and prior to its penetration by the blowing tube;

Fig. 6 indicates the stage of penetration of the blowing tube into the charge of plastic material; and Fig. 7 represents the stage of removal of the blowing tube subsequent to the molding and curing operation, but prior to the removal of the object from the mold.

Referring first to the embodiments of Figures 1 to 3, a mold 10, Fig. 1, of steam-jacketed or similar conventional structure, is in open status. Pursuant to conventional practice, such mold may comprise two or more portions, the interior configuration of each corresponding to the corresponding portion of the outer configuration of the object to be formed. For purpose of illustration, the mold 10 is illustrated as comprising two half-portions, the halves of which may be brought together and secured in operative position in any conventional manner. The mold is heated at time of closing, by the introduction of steam under suitable temperature and pressure condition, as readily understood by those skilled in the art.

Disposed suitably above the neck portion of the mold, is a preferably tubular charging device 12, desirably suitably mounted for reciprocation toward or away from the upper surface of the mold 10 and including, about its lower portion, suitable means 14 for heating the wall of the tube 12. The lower portion of the charging tube 12 may be closed by a suitable gate mechanism 16; the illustrated mechanism contemplates a two part gate, so arranged that the respective parts may be separated to open the lower portion of the charging tube 12. As shown, suitable gasket means 18 may be employed to effect a pressure tight seal of the tube against the upper surface of the mold during subsequent stages of the molding process.

A measured charge 20 of the organic molding material is introduced, in any desired manner, into the charging tube 12, it being understood that at this stage, the plastic is in its usual powdered or granular form. Arranged for reciprocatory movement within the charging tube is a plunger 22, formed with a preferably square-cut shoulder from which extends a neck 24. As shown, plunger 22 may have a central bore 26, the said bore having communication with a source of gas (not shown) of suitable temperature and pressure condition. Either prior to or subsequent to the heating of the mass 20 of material, such heating being by conduction of heat from the means 14 through the walls of the charging tube 12, the plunger 22 is brought into its Fig. 1 position, suitable gas pressure within the bore 26 maintaining such bore free of the material 20. Desirably, the heating means 14 comprises any suitable electric heating coil, steam coil, or the like, maintained under a suitable temperature condition.

After the charge 20 has attained a condition of viscosity rendering it capable of being molded but in a self-supporting state, the gate 16 is operated to permit the movement of the now plastic charge 20 from the charging tube 12 into the mold 10, preferably by positive ejection of the charge from the tube 12 by downward movement of plunger 22.

The temperatures and pressures required for effecting desired viscosity of the charge 20 and for attaining the proper curing and setting of the plastic material, are dependent, in large degree, upon the type of plastic material being employed. For example, temperature of the order of 350° F., and pressure of from 1000 to 2000 pounds per square inch are typical of molding processes for objects formed from a thermo-setting plastic, and having an average wall thickness of three-sixteenths of an inch.

The mold 10 is desirably preheated to approximately the curing temperature, by the circulation of steam of desired temperature and pressure through passages 30 in the mold. The temperature of the charge 20, however, at the stage of its introduction into the mold, may be of the order of 10° F. greater than the mold temperature, said charge temperature being substantially uniform throughout the mass of material. The chilling effect of the mold upon the plastic charge 20 brings about a slight hardening, or "skin formation" on the outer wall of the viscous charge, the interior of the charge being of greater temperature, and thereby being more fluid—less viscous—than the outermost portion thereof.

Following the introduction of the charge 20 as a viscous mass into the mold 10, the plunger 22 may be moved upwardly away from charge 20, and preferably concurrently with such withdrawal, nitrogen or other suitable gas, at a temperature and pressure suitable for curing such plastic material, is caused to flow through the tubular neck 24 and into the space 28, see Fig. 2, resulting from the withdrawal of the plunger. The pressure of gas causes the outward expansion of the plastic charge, the outer "skin" thereof affording resistance to the gas pressure and thereby effecting the even expansion of the plastic material into contact with the walls of the mold 10.

Depending on the setting characteristics of the material being molded, the gas pressure is maintained for a predetermined time period; for example, approximately two and one-half (2½) minutes. After the expiration of this setting period, the gas pressure is relieved, and the charging tube 12 and gas plunger 24 removed from contact with the mold.

The final stage of treatment is the removal of the object, 20a, from the mold, and the removal of the "flash" or other excess of material from the formed object.

In a second embodiment of my invention, shown in Figs. 4 to 7, inclusive, the charge 20 of plastic material may be treated, in similar manner, within charging tube 12, such charging tube being heated, as by the electric heating element 14. Desirably, the charging tube 12 is provided with a piston or equivalent plunger 40, for ejecting the heated viscous plastic material from the tube, and into the mold 10.

As indicated in Fig. 5, the closed mold 10, with the plastic charge 20 disposed therein as a moldable but self-supporting mass, may be brought into operative relationship with respect to a piston 41 arranged to close the upper opening of mold 10, said piston being provided at its lower surface with a suitable temperature and pressure resistant gasket 42. Preferably slidably mounted within the piston 41, there is provided a gas inlet tube 43, connected at one end to a suitable source of gas under desired temperature and pressure condition. By suitable means, and subsequent to the positioning of piston 41, the gas tube 43 may be plunged into the mass 20, pressure of gas within the tube 43 preventing any flow of material into the tube. Subsequent to or during the insertion of the tube into the plastic mass, as shown in Fig. 6, the gas, under elevated pressure condition, expands the plastic charge into contact with the walls of the mold 10. After the required setting period, the gas pressure is relieved, the tube 43 and the piston 41 withdrawn, and the mold opened to effect the removal of the object.

In such second embodiment of my invention, and as is shown in Figs. 6 and 7, the outer diameter of the gas pressure tube 43 may be equal to the desired interior diameter of the neck or equivalent portion of the molded object. Additionally, the piston 41 may be provided with a boss 44 arranged to contact with the upper interior portion of the mold 10 and thus define an additional mold passage 45 which shapes the lip of the bottle or equivalent hollow object.

It will be understood that in the second embodiment of my invention, the same or equivalent temperature relationship exists between the temperature of the plastic charge and the temperature of mold 10, such temperature difference forming, as above, a "skin" against which the gas pressure acts to effect the outward movement of the plastic charge.

In practicing the invention with thermo-plastic materials, a method substantially equivalent in all respects is followed, except that in thermoplastic materials, "setting" is completed by the cooling of the material subsequent to its expansion into contact with the sides of the mold. Therefore, in the fabrication of thermo-plastic materials pursuant to the present invention, means should be provided to cool the mold 10 subsequent to the blowing operation, to effect the setting of the material. Such cooling may be by radiation of heat subsequent to the shutting off of the steam or other mold heating means, or may be effected by passing cool water through the channels 30 in the mold 10.

In the respective embodiments of my invention, gases generated within plastic mass 20 during the stages of setting and curing such mass commingle with the gas employed for blowing and setting the object. In my invention, therefore, the respective gas passages 26, 43, of the two illustrated embodiments of my invention accommodate such generated gas, and the necessity for leaving the mold in partially open status during the first stages of the molding operation—a conventional practice in present molding methods—is eliminated.

Whereas I have described my invention by reference to specific forms thereof, it will be understood that many changes and modifications may be made without departing from the spirit of the invention.

I claim:

1. The method of forming hollow articles from organic plastic materials, which comprises placing within suitable heating means a charge of molding powder in the solid state equivalent to the volume of the walls of the article to be formed; heating said material to a state of plasticity wherein the material is capable of being molded, but is self-supporting; placing said material as a self-supporting mass wholly within a mold which is at a temperature lower than the temperature of the heated material; introducing a blowing tube centrally into said mass to substantially the full depth thereof; and subjecting said mass to the action of fluid under pressure discharged through said tube to expand the mass into the shape of the mold cavity.

2. The method of forming hollow articles from organic plastic materials, which comprises placing within suitable heating means a charge of molding powder in the solid state substantially equivalent to the volume of the walls of the article to be formed; heating said material to a state of plasticity wherein the material is capable of being molded, but is self-supporting; introducing said material as a self-supporting mass directly from said heating means to a position wholly within a heated mold; introducing a blowing tube centrally into said mass; and subjecting said mass to fluid at a suitable temperature and pressure by discharging said fluid through said tube to expand the mass into the shape of the mold cavity.

3. The method of forming hollow articles from organic plastic materials, which comprises placing within suitable heating means a charge of molding powder in the solid state equivalent to the volume of the walls of the article to be formed, said material being disposed about a centrally arranged blowing tube; heating said material to a state of plasticity wherein the material is capable of being molded, but is self-supporting; introducing said plastic material and said centrally arranged blowing tube into a heated mold; partially withdrawing said blowing tube from said material, whereby said material remains as a substantially self-supporting mass wholly within said mold; and subjecting said mass to the action of fluid under pressure discharged through said tube to expand the mass into the shape of the mold cavity.

4. The method of forming hollow articles from organic plastic materials, which comprises placing within suitable heating means a charge of molding powder equivalent to the volume of the walls of the article to be formed, said material being disposed about a centrally arranged blowing tube; heating said material to a state of plasticity wherein the material is capable of being molded, but is self-supporting; introducing said plastic material and said centrally arranged blowing tube directly into a heated mold; partially withdrawing said blowing tube from said material, whereby said material remains as a substantially self-supporting mass wholly within said mold; and subjecting said mass to the action of fluid under pressure discharged through said tube coincidentally with the withdrawal of the tube to expand the mass into the shape of the mold cavity.

FRANCES CUSHING HALL.